(12) United States Patent
Hirata et al.

(10) Patent No.: US 10,407,828 B2
(45) Date of Patent: Sep. 10, 2019

(54) SHEET MANUFACTURING APPARATUS AND SHEET MANUFACTURING METHOD

(71) Applicant: SEIKO EPSON CORPORATION, Tokyo (JP)

(72) Inventors: Yoshitomo Hirata, Nagano (JP); Yoshiaki Murayama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 77 days.

(21) Appl. No.: 14/965,086

(22) Filed: Dec. 10, 2015

(65) Prior Publication Data

US 2016/0186379 A1    Jun. 30, 2016

(30) Foreign Application Priority Data

Dec. 25, 2014    (JP) .................................. 2014-261887

(51) Int. Cl.
*D21F 9/00*       (2006.01)
*D21F 11/00*      (2006.01)
*D21B 1/08*       (2006.01)

(52) U.S. Cl.
CPC ................. *D21F 9/00* (2013.01); *D21B 1/08* (2013.01); *D21F 11/00* (2013.01); *Y02W 30/642* (2015.05)

(58) Field of Classification Search
USPC ................ 162/141, 147, 189, 202, 261, 289
See application file for complete search history.

(56) References Cited

U.S. PATENT DOCUMENTS

| | | | | |
|---|---|---|---|---|
| 4,435,234 A * | 3/1984 | Hunt | ...................... | B32B 29/00 156/62.4 |
| 5,134,023 A * | 7/1992 | Hsu | ........................ | B27N 3/007 264/109 |
| 5,139,616 A * | 8/1992 | Ling | ...................... | D21C 5/022 162/147 |
| 5,316,621 A | 5/1994 | Kitao et al. | | |
| 2013/0216734 A1 | 8/2013 | Van Pottelbergh et al. | | |
| 2014/0027075 A1 | 1/2014 | Yamagami et al. | | |
| 2014/0290890 A1 | 10/2014 | Seki et al. | | |
| 2014/0374047 A1 | 12/2014 | Yamagami | | |

FOREIGN PATENT DOCUMENTS

| | | |
|---|---|---|
| CN | 104074082 A | 10/2014 |
| JP | 04-209881 A | 7/1992 |
| JP | 2000-119999 A | 4/2000 |
| JP | 2012-144819 A | 8/2012 |
| JP | 2013-521154 A | 6/2013 |
| WO | WO 2012/095928 A1 * | 7/2012 |

OTHER PUBLICATIONS

Smook, Handbook for Pulp and Paper Technologists, 2nd ed, Angus Wilde Publications, 1992, pp. 209-219.*

* cited by examiner

*Primary Examiner* — Dennis R Cordray (57) ABSTRACT

A sheet manufacturing apparatus includes a defibrating unit that defibrates a raw material containing fiber in the atmosphere, a forming unit that forms a sheet by using at least a part of a defibrated material that is defibrated by the defibrating unit, a first supply unit that supplies a first paper material to the defibrating unit, and a second supply unit that supplies a second paper material to the defibrating unit. At least one of the first paper material and the second paper material is a paper material having a resin layer.

9 Claims, 3 Drawing Sheets

SHEET MANUFACTURING APPARATUS AND SHEET MANUFACTURING METHOD

BACKGROUND

1. Technical Field

The present invention relates to a sheet manufacturing apparatus and a sheet manufacturing method.

2. Related Art

In the related art, a paper recycling apparatus that crushes and defibrates used papers of A4 size used in offices, and forms papers by a defibrated material that has been defibrated is known (for example, see JP-A-2012-144819).

However, in the apparatus described above, since a raw material to be supplied is one type (only used papers), there is a problem that it is not possible to change characteristics of the paper to be manufactured.

SUMMARY

The invention can be realized in the following aspects or application examples.

APPLICATION EXAMPLE 1

According to this application example, there is provided a sheet manufacturing apparatus including a defibrating unit that defibrates a raw material containing fiber in the atmosphere; a forming unit that forms a sheet by using at least a part of a defibrated material that is defibrated by the defibrating unit; a first supply unit that supplies a first paper material to the defibrating unit; and a second supply unit that supplies a second paper material to the defibrating unit, in which least one of the first paper material and the second paper material is a paper material having a resin layer.

In this case, since the paper material having the resin layer is used in the formation of the sheet, it is possible to change characteristics of the sheet without using functional additives.

APPLICATION EXAMPLE 2

In the sheet manufacturing apparatus according to the application example, the paper material having the resin layer may be a water-insoluble paper material.

In this case, it is possible to lower the density of the sheet by mixing the water-insoluble paper material having the resin layer.

APPLICATION EXAMPLE 3

In the sheet manufacturing apparatus according to the application example, the paper material having the resin layer may be a release paper containing a glassine paper.

In this case, it is possible to lower the density of the sheet by mixing the glassine paper. Furthermore, it is possible to mount the roll-shaped release paper after releasing a label on a supply unit of the sheet manufacturing apparatus and to reuse the release paper as it is.

APPLICATION EXAMPLE 4

In the sheet manufacturing apparatus according to the application example, the sheet manufacturing apparatus may further include a control unit that is able to change a supply amount of the second paper material with respect to a supply amount of the first paper material.

In this case, it is possible to change the density, strength, texture, and the like of the sheet.

APPLICATION EXAMPLE 5

According to the application example, there is provided a sheet manufacturing method, which defibrates a raw material containing fiber in the atmosphere and forms a sheet by using at least a part of a defibrated material that is defibrated, the method including supplying and defibrating a first paper material and a second paper material. At least one of the first paper material and the second paper material is a paper material having a resin layer.

In this case, since the paper material having the resin layer is used in the formation of the sheet, it is possible to change characteristics of the sheet without using functional additives.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings. Moreover, in each view below, scales of each member and the like are illustrated different from real scales to make each member and the like be recognizable sizes.

First, a configuration of a sheet manufacturing apparatus will be described. The sheet manufacturing apparatus is, for example, based on a technique of forming a new sheet Pr from a raw material (material to be defibrated) Pu such as pure pulp sheets and used papers. The sheet manufacturing apparatus according to the embodiment includes a defibrating unit that defibrates a raw material containing fiber in the atmosphere, a forming unit that forms a sheet by using at least a part of a defibrated material that is defibrated by the defibrating unit, a first supply unit that supplies a first paper material to the defibrating unit, and a second supply unit that supplies a second paper material to the defibrating unit. At least one of the first paper material and the second paper material is a paper material having a resin layer. Hereinafter, a configuration of the sheet manufacturing apparatus will be specifically described.

Figure 1:
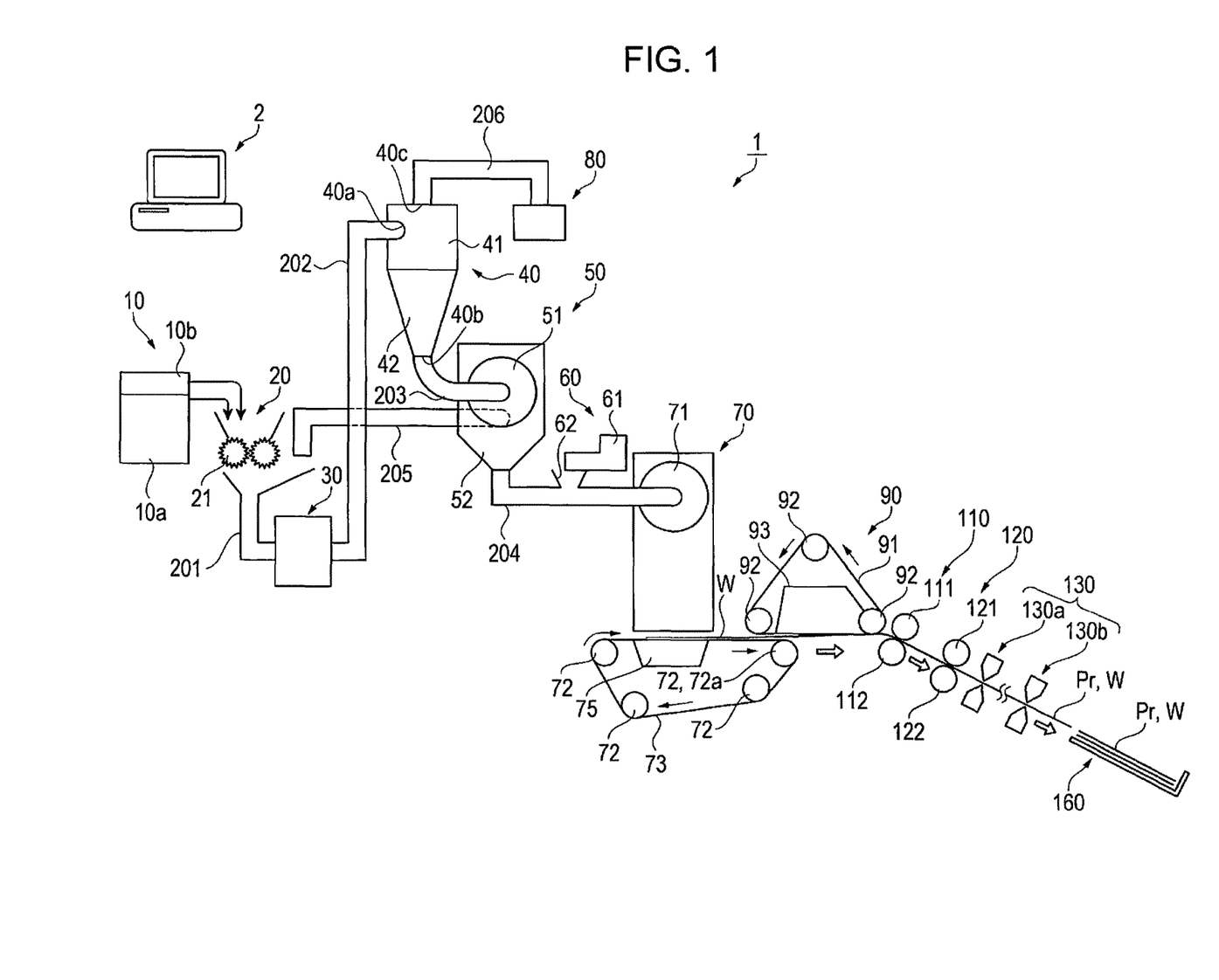
FIG. 1 is a schematic view illustrating a configuration of a sheet manufacturing apparatus.

FIG. 1 is a schematic view illustrating the configuration of the sheet manufacturing apparatus according to the embodiment. As illustrated in FIG. 1, a sheet manufacturing apparatus 1 of the embodiment includes a supply unit 10, a defibrating unit 30, a classifying unit 40 and a sorting unit 50 configuring a forming unit, an additive feeding unit 60, a accumulation unit 70, a heating and pressing unit 120, and the like. Furthermore, a control unit 2 for controlling these members is included. The control unit 2 is, for example, a microprocessor (MPU) and a personal computer (PC), and includes an input and output unit, a recording unit, a processing unit, and the like.

The supply unit 10 is provided for supplying a paper material as the raw material containing fiber to the defibrating unit 30. Moreover, in the embodiment, the supply unit 10 supplies the paper material to a crushing unit 20 and to the defibrating unit 30 through the crushing unit 20. Furthermore, the supply unit 10 of the embodiment includes a first supply unit 10a for supplying a first paper material and a second supply unit 10b for supplying a second paper material. Moreover, a detailed configuration of the supply unit 10 will be described below.

The crushing unit 20 cuts supplied used paper Pu to paper pieces of several square centimeters. The crushing unit 20 includes crushing blades 21 and configures a device for spreading a cut width of blades of a conventional shredder. Thus, it is possible to easily cut the supplied used paper Pu to the paper pieces. Then, cut and crushed papers are supplied to the defibrating unit 30 through a pipe 201.

The defibrating unit 30 defibrates a material containing fiber in the atmosphere (air). Specifically, the defibrating unit 30 includes rotating rotary blades (not illustrated) and performs defibration to untangle the crushed papers supplied from the crushing unit 20 in fibriform. In the present application, what is defibrated by the defibrating unit 30 is referred to as the material to be defibrated and what passes through the defibrating unit 30 is referred to as the defibrated material. The defibrating unit 30 of the embodiment is a dry type and performs defibration in the atmosphere. Coating materials to the paper such as ink, toner, and a blur-preventing agent, and the like are separated from the fiber by being particles (hereinafter, referred to as "ink particles") of several tens of μm by the defibrating process of the defibrating unit 30. Thus, the defibrated material drawn out from the defibrating unit 30 is fiber and the ink particles obtained by defibration of the paper pieces. Then, a mechanism of generating airflow by rotation of the rotary blades is provided and the defibrated fiber is transported to the classifying unit 40 in the atmosphere through a pipe 202 by riding on the airflow. Moreover, an airflow generating device for generating the airflow to transport the defibrated fiber to the classifying unit 40 through the pipe 202 may be separately provided in the defibrating unit 30 when required.

The classifying unit 40 classifies an introduced material that is introduced by the airflow. In the embodiment, the defibrated material as the introduced material is classified into the ink particles and the fiber. The classifying unit 40 can classify the transported defibrated material into the ink particles and the fiber by using the airflow, for example, by applying a cyclone. Moreover, another airflow type classifier may be used instead of the cyclone. In this case, as the airflow type classifier other than the cyclone, for example, elbow jet, eddy classifier, and the like are used. The airflow type classifier generates a whirling airflow, separates, and classifies the defibrated material by a difference in a centrifugal force received by a size and density of the defibrated material. Therefore, it is possible to adjust a classification point by adjusting a speed of the airflow and the centrifugal force. Accordingly, the defibrated material is separated into small ink particles of relatively low density and the fiber of high density having particles greater than the ink particles in size.

The classifying unit 40 of the embodiment is a tangent input type cyclone and is configured of an inlet 40a introducing the introduced material from the defibrating unit 30, a cylindrical unit 41 to which the inlet 40a is attached in a tangential direction, a conical unit 42 following a lower portion of the cylindrical unit 41, a lower outlet 40b provided in a lower portion of the conical unit 42, and an upper air outlet 40c for discharging fine powder provided in an upper center of the cylindrical unit 41. The diameter of the conical unit 42 is decreased going downward in a vertical direction.

In a classifying process, the airflow on which the defibrated material introduced from the inlet 40a of the classifying unit 40 is changed to a circumferential movement in the cylindrical unit 41 and the conical unit 42, and the classification is performed by applying the centrifugal force. Then, the fiber that is greater than the ink particles in size and has a high density moves to the lower outlet 40b, and the ink particles that are relatively small and have a low density are guided to the upper air outlet 40c as fine powder together with air. Then, the ink particles are discharged from the upper air outlet 40c of the classifying unit 40. Then, the discharged ink particles are recovered in a receiving unit 80 through a pipe 206 connected to the upper air outlet 40c of the classifying unit 40. On the other hand, a classified material containing the classified fiber is transported from the lower outlet 40b of the classifying unit 40 to the sorting unit 50 through a pipe 203 in the atmosphere. The classified material may be transported from the classifying unit 40 to the sorting unit 50 by the airflow when being classified or may be transported from the classifying unit 40 that is present in an upper portion to the sorting unit 50 that is present in a lower portion by gravity. Moreover, a suction unit and the like for efficiently suctioning a short fiber mixture from the upper air outlet 40c may be provided in the upper air outlet 40c of the classifying unit 40, the pipe 206, and the like. Classification is not intended to accurately divide the defibrated material by a certain size and density as a boundary. Furthermore, classification is not intended to accurately divide the defibrated material into the fiber and the ink particles. The relatively short fiber in the fibers is discharged from the upper air outlet 40c together with the ink particles. The relatively large fiber in the ink particles is discharged from the lower outlet 40b together with the fiber.

The sorting unit 50 sorts the classified material (the defibrated material) containing the fiber that is classified by the classifying unit 40 by passing through a sieve unit 51 having a plurality of openings. Furthermore, specifically, the classified material containing the fiber that is classified by the classifying unit 40 is sorted into a passed material that passes through the opening and a remaining material that does not pass through the opening. The sorting unit 50 of the embodiment includes a function of dispersing the classified material in the air by a rotating motion. Then, the material passing through the opening by sorting of the sorting unit 50 is transported from a passed material transport unit 52 on the accumulation unit 70 side through a pipe 204. On the other hand, the remaining material that does not pass through the opening by sorting of the sorting unit 50 is returned again to the defibrating unit 30 through a pipe 205 as material to be defibrated. Thus, the remaining material is re-used (recycled) without being discarded.

Passed material passing through the opening by sorting of the sorting unit 50 is transported to the accumulation unit 70 through the pipe 204 in the atmosphere. The passed material may be transported from the sorting unit 50 to the accumulation unit 70 by a blower (not illustrated) generating the airflow or may be transported from the sorting unit 50 that is present in the upper portion to the accumulation unit 70 that is present the lower portion by gravity. The additive feeding unit 60 for adding additives such as binding resin (for example, thermoplastic resin or thermosetting resin) to the transported passed material is provided in the pipe 204 between the sorting unit 50 and the accumulation unit 70.

Moreover, as the additives, for example, a flame retardant, a whiteness enhancer, a sheet strength agent, a sizing agent, an absorption modifier, fragrance, deodorant, and the like may be also fed in addition to the binding resin. The additives are stored in an additive reservoir 61 and are fed from a feeding port 62 by a feeding mechanism (not illustrated).

The accumulation unit 70 is provided to accumulate a material containing the fiber and accumulates at least a part of the defibrated material that is defibrated by the defibrating unit 30. Specifically, the accumulation unit 70 is provided to accumulate the material by using a material containing the fiber and the binding resin fed from the pipe 204, forms a web W, and includes a mechanism that uniformly disperses the fiber in the atmosphere. Furthermore, the accumulation unit 70 has a moving unit that deposits the defibrated material as the accumulated material (web W) while moving. Moreover, the moving unit of the embodiment is configured of tension rollers 72 and an endless mesh belt 73 in which a mesh is formed by being stretched by the tension rollers 72. Then, the mesh belt 73 is rotated (moved) in one direction by rotating at least one of the tension rollers 72. Moreover, the web W according to the embodiment refers to a configuration form of an object containing the fiber and the binding resin. Thus, the web is illustrated as a web even if the form such as dimensions is changed when heating, pressing, cutting, and transporting the web, and the like.

First, as a mechanism of uniformly dispersing the fiber in the atmosphere, a forming drum 71 to the inside of which the fiber and the binding resin are fed is disposed in the accumulation unit 70. Then, it is possible to uniformly mix the binding resin (additives) in the passed material (fiber) by driving the forming drum 71 to rotate. A screen having a plurality of small holes is provided in the forming drum 71. Then, it is possible to uniformly mix the binding resin (additives) in the passed material (fiber) and to uniformly disperse the fiber and the mixture of the fiber and the binding resin passing through the small holes by driving the forming drum 71 to rotate.

The mesh belt 73 is disposed below the forming drum 71. Furthermore, a suction device 75 as a suction unit for generating the airflow directed vertically downward is provided vertically below the forming drum 71 through the mesh belt 73. It is possible to suction the fiber dispersed in the atmosphere on the mesh belt 73 by the suction device 75.

Then, the fiber and the like passing through the small holes of the forming drum 71 are accumulated on the mesh belt 73 by a suction force by the suction device 75. In this case, it is possible to form the web W that is accumulated in an elongated shape containing the fiber and the binding resin by moving the mesh belt 73 in one direction. The continuous strip-shaped web W is formed by continuously performing dispersion from the forming drum 71 and moving of the mesh belt 73. Moreover, the mesh belt 73 may be made of metal, resin, and nonwoven fabric, and may be any one as long as the fiber can be accumulated and the airflow can be passed through. Moreover, if a hole diameter of the mesh of the mesh belt 73 is too large, the fiber enters between the meshes and becomes uneven when forming the web W (sheet), on the other hand, if the hole diameter of the mesh is too small, a stable airflow by the suction device 75 is difficult to form. Thus, it is preferable that the hole diameter of the mesh is appropriately adjusted. The suction device 75 can be configured by forming a closed box having a window of a desired size opened under the mesh belt 73, suctioning air from the outside of the window, and making an inside of the box be a negative pressure.

The web W formed on the mesh belt 73 is transported in a transport direction (white arrows in the view) by rotation of the mesh belt 73. An intermediate transport unit 90 is disposed on an upper side of the mesh belt 73 as a release unit. The web W is released from the mesh belt 73 and is transported on a pressing unit 110 side by the intermediate transport unit 90. That is, the release unit (intermediate transport unit 90) releasing the accumulated material (web W) from a moving unit (mesh belt 73) is provided and the released accumulated material (web W) can be transported to the pressing unit 110. The intermediate transport unit 90 is configured so as to transport the web W while suctioning the web W vertically upward (direction separating the web W from the mesh belt 73). The intermediate transport unit 90 is disposed by being separated from the mesh belt 73 vertically upward (direction perpendicular to a surface of the web W) and a part of the intermediate transport unit 90 is disposed to be shifted to the mesh belt 73 on a downstream side in the transport direction of the web W. Then, a transporting section of the intermediate transport unit 90 is a section from a tension roller 72a on the downstream side of the mesh belt 73 to the pressing unit 110.

The intermediate transport unit 90 has a transport belt 91, a plurality of tension rollers 92, and a suction chamber 93. The transport belt 91 is an endless mesh belt which is stretched by the tension rollers 92 and in which a mesh is formed. Then, the transport belt 91 is rotated (moved) in one direction by rotating at least one of the plurality of tension rollers 92.

The suction chamber 93 is disposed on an inside of the transport belt 91 and has a hollow box shape having an upper surface, and four side surfaces coming into contact with the upper surface, and of which a bottom surface (surface facing the transport belt 91 positioned below) is opened. Furthermore, the suction chamber 93 includes a suction unit generating the airflow (suction force) into the suction chamber 93. Then, an inner space of the suction chamber 93 is suctioned and air flows in from bottom surface of the suction chamber 93 by driving the suction unit. Thus, the airflow is generated upward the suction chamber 93, the web W is suctioned from above the web W, and the web W can be suctioned to the transport belt 91. Then, the transport belt 91 is moved (circulated) by rotating the tension rollers 92 and can transport the web W to the pressing unit 110. Furthermore, the suction chamber 93 overlaps a part of the mesh belt 73 when viewed from above and is disposed in a position on the downstream side where the suction device 75 does not overlap. Thus, the web W on the mesh belt 73 is released from the mesh belt 73 in a position facing the suction chamber 93 and can be suctioned to the transport belt 91. The tension rollers 92 rotate such that the transport belt 91 moves at the same speed as that of the mesh belt 73. If there is a difference in the speeds of the mesh belt 73 and the transport belt 91, it is possible to prevent that the web W is broken or buckled by being pulled by making the speed thereof be the same speed.

The pressing unit 110 is disposed on the downstream side of the intermediate transport unit 90 in the transport direction of the web W. The pressing unit 110 is configured of a pair of pressing rollers 111 and 112, and presses the transported web W. For example, the web W is pressed so as to be the web W of a thickness of appropriately ⅕ to 1/30 of the thickness of the web W formed by the accumulation unit 70 by the pressing unit 110. Thus, it is possible to strength of the web W.

The heating and pressing unit 120 is disposed on a downstream side of the pressing unit 110 in the transport direction of the web W. The heating and pressing unit 120 is provided to heat and press the web W as the accumulated material that is accumulated by the accumulation unit 70. The heating and pressing unit 120 is provided to bind the fibers contained in the web W through the binding resin. The heating and pressing unit 120 of the embodiment is configured of a pair of heating rollers 121 and 122. Heating members such as heaters are provided in center portions of rotary shafts of the heating rollers 121 and 122, and it is possible to heat and press the transported web W by allowing the web W to pass through between the pair of heating rollers 121 and 122. Then, the web W is heated and pressed by the pair of heating rollers 121 and 122, and then the binding resin is easily entangled by being melted, fiber intervals are shortened, and contact points between the fibers are increased.

As a cutting unit 130 cutting the web W, a first cutting unit 130a cutting the web W along the transport direction of the web W and a second cutting unit 130b cutting the web W in a direction intersecting the transport direction of the web W are disposed on the downstream side of the heating and pressing unit 120. The first cutting unit 130a is, for example, a slitter and cuts the web W according to a predetermined cutting position in the transport direction of the web W. The second cutting unit 130b is, for example, a rotary cutter and cuts the continuous web W in a sheet form according to a predetermined cutting position that is set in a predetermined length. Thus, the sheet Pr (web W) of a desired side is formed. The cut sheets Pr are stacked on a stacker 160 and the like. Moreover, it may be configured so as to wind the continuous web W on a winding roller without cutting the web W. As described above, it is possible to manufacture the sheet Pr in the sheet manufacturing apparatus 1.

Moreover, the sheet according to the embodiment mainly refers that formed in a sheet shape, which contains the fiber such as the used paper and the pure pulp as the raw material. However, the sheet is not limited to the embodiment and may be a board shape or a web shape (or a shape having unevenness). Furthermore, as the raw material, plant fibers such as cellulose, chemical fibers such as polyethylene terephthalate (PET) and polyester, and animal fibers such as wool and silk may be included. The sheet in the present application is divided into paper and non-woven fabric. Paper includes aspects formed in a thin sheet shape and includes recording paper for writing or printing, wallpaper, wrapping paper, colored paper, Kent paper, and the like. Non-woven fabric has a thickness thicker than that of paper or has strength lower than that of paper, and includes general non-woven fabric, fiber board, tissue paper, kitchen paper, cleaner, filter, liquid absorption material, sound-absorbing material, cushioning material, mat, and the like.

Furthermore, the used paper in the embodiment described above mainly refers to printed paper and it is regarded as used paper regardless of whether or not the paper is used, as long as what is formed in paper is the raw material.

Figure 2:
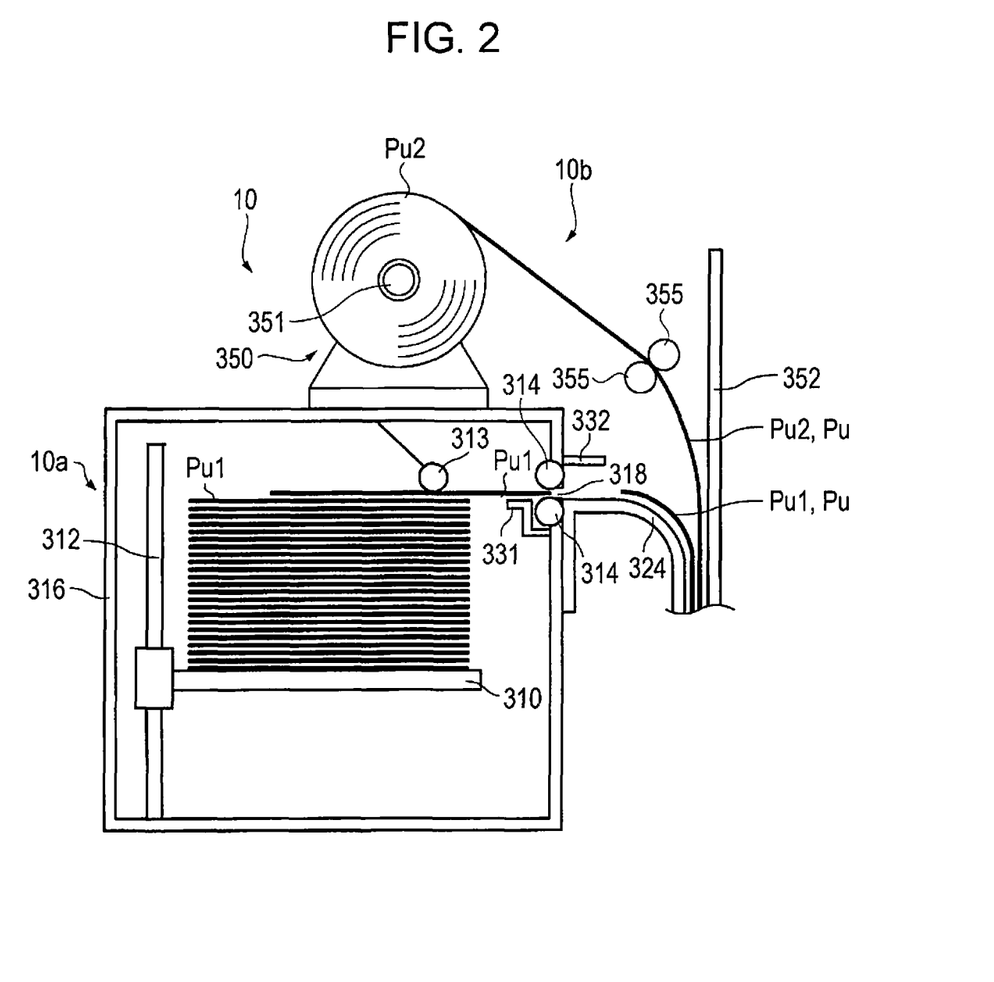
FIG. 2 is a schematic view illustrating a configuration of a supply unit.

Next, a detailed configuration of the supply unit 10 will be described. FIG. 2 is a schematic view illustrating the configuration of the supply unit. The supply unit 10 includes the first supply unit 10a for supplying a first paper material Pu1 to the defibrating unit 30 and a second supply unit 10b for supplying a second paper material Pu2 to the defibrating unit 30. Then, at least one of the first paper material Pub and the second paper material Pu2 is a paper material Pu having the resin layer. Moreover, in the embodiment, the first paper material Pub and the second paper material Pu2 are supplied from the first supply unit 10a and the second supply unit 10b to the defibrating unit 30 through the crushing unit 20.

Furthermore, the first paper material Pu1 is, for example, the used paper (paper material having no resin layer) of the sheet of A4 size and the like mainly used in offices in present, and the second paper material Pu2 is the paper material having the resin layer.

As described above, the supply unit 10 of the embodiment is configured to able to supply the first paper material Pu1 and the second paper material Pu2 having the materials different from each other to the defibrating unit 30 at the same time period, defibrates the first paper material Pu1 and the second paper material Pu2, and forms the sheet Pr by using the defibrated material that is defibrating-processed. Thus, it is possible to form the sheet Pr having characteristics different from those of a sheet formed only by paper material having no resin layer. Furthermore, in this case, it is possible to manufacture the sheet Pr without using functional additives for generating the characteristics of the sheet Pr.

Specifically, the paper material of the second paper material Pu2 having the raw material is a water-insoluble paper material. Thus, it is possible to form the sheet Pr having hydrophobic properties and characteristics of low density without using functional additives such as hollow particles and thermoplastic foamed particles. More specifically, the paper material of the second paper material Pu2 having the resin layer is the release paper containing the glassine paper. Here, the glassine paper is, for example, used as a configuration member contained in the release paper of a seal label paper. Moreover, since the paper material (difficult-to-process used paper, hard-to-recycle used paper and the like) having the raw material such as the glassine paper contains a water-insoluble member, the paper material remains as foreign materials without being soluble in water and the foreign materials are removed in wet type sheet manufacturing. In wet type sheet manufacturing, the sheet containing a member containing the resin layer such as the glassine paper is not manufactured. On the other hand, in the embodiment, it is possible to manufacture the sheet Pr by using the paper material (difficult-to-process used paper, hard-to-recycle used paper and the like) having the resin layer such as the glassine paper by dry type manufacturing. Particularly, it is possible to mount the release paper containing the glassine paper of a roll shape after releasing the seal label paper on the second supply unit 10b of the sheet manufacturing apparatus as it is and to easily reuse the release paper. Hereinafter, a specific configuration of the supply unit 10 will be described.

As illustrated in FIG. 2, the first supply unit 10a that supplies the first paper material Pu1 to the defibrating unit 30 and the second supply unit 10b that supplies the second paper material Pu2 to the defibrating unit 30 are provided.

The first supply unit 10a has a housing 316 and a stacking unit 310 for stacking the first paper material Pu1 on an inside of the housing 316. Furthermore, a pickup roller 313 abuts the uppermost first paper material Pu1 of the stacked first paper materials Pu1. The pickup roller 313 rotates, and then the uppermost first paper material Pu1 is transported on an outlet 318 side provided in the housing 316. The first paper material Pu1 that is transported on the outlet 318 side is discharged from the outlet 318 by feeding rollers 314. Then, the discharged first paper material Pu1 is transported along a guide 324. Thereafter, further, the first paper material Pu1 is transported to the crushing unit 20 along the guide 324 and a guide 352. In addition, the stacking unit 310 moves upward whenever one or a plurality of sheets of the first paper materials Pu1 is transported by the pickup roller 313. Furthermore, the position of the stacking unit 310 is able to be moved vertically according to the position of the pickup roller 313 in a vertical direction. Thus, the position of the stacking unit 310 is positioned according to a stacking amount of the first paper material Pu1. Furthermore, the position of the pickup roller 313 is positioned in a substantially constant position with respect to the feeding rollers 314. In the illustrated example, the stacking unit 310 is connected to an up-down driving shaft unit 312, the up-down driving shaft unit 312 is rotated, and thereby the stacking unit 310 can be moved upward and downward. The rotation of the up-down driving shaft unit 312 is performed by driving of a motor (not illustrated) connected to the up-down driving shaft unit 312. As the up-down driving shaft unit 312, for example, a lead screw is used.

Moreover, a configuration of the first supply unit 10a is not specifically limited if the stacked first paper materials Pu1 can be supplied to the crushing unit 20. For example, a spring biasing the stacking unit 310 on the pickup roller 313 side may be provided instead of the up-down driving shaft unit 312.

Furthermore, a first sensor 331 and a second sensor 332 are provided in the first supply unit 10a. The first and second sensors 331 and 332 are connected to the control unit 2. The first sensor 331 is provided in the vicinity of the outlet 318 within the housing 316 of the first supply unit 10a. The first sensor 331 detects whether or not the first paper material Pu1 is present on the stacking unit 310. Moreover, a form and an installation position of the first sensor 331 are not specifically limited if the first sensor 331 can detect whether or not the first paper material Pu1 is present on the stacking unit 310. The second sensor 332 is disposed on an outside of the housing 316 and in the vicinity of the outlet 318 of the first supply unit 10a. The second sensor 332 detects whether or not the first paper material Pu1 is supplied from the first supply unit 10a (whether or not the first paper material Pu1 is discharged from the outlet 318). Moreover, a form and an installation position of the second sensor 332 are not specifically limited if the second sensor 332 can detect whether or not the first paper material Pu1 is supplied from the first supply unit 10a. Then, the control unit 2 is configured such that an supply amount of the first paper material Pu1 can be obtained based on an detection output of the second sensor 332.

The second supply unit 10b transports the second paper material Pu2. The second paper material Pu2 is the release paper of the seal label paper and, for example, is the release paper containing the glassine paper of the roll shape after releasing the seal label by an automatic machine. Then, in the embodiment, it is configured such that after the seal label is released by the automatic machine attaching the seal label to a product, the release paper containing the glassine paper wound in the roll shape can be transported. Specifically, a roll unit 350 that disposes the second paper material Pu2 of the roll shape on the first supply unit 10a is provided.

Furthermore, a pair of transport roller 355 transporting the second paper material Pu2 is provided, the transport rollers 355 are driven to rotate, and thereby the second paper material Pu2 of the roll shape inserted into a shaft unit 351 of the roll unit 350 is moved and transported along the guide 352. Then, thereafter, the second paper material Pu2 is transported to the crushing unit 20 along the guide 352 and the guide 324.

Furthermore, a third sensor (not illustrated) detecting a rotation amount of one roller 355 of the pair of transport rollers 355 is disposed and the third sensor is connected to the control unit 2. The control unit 2 is configured so as to obtain the moving amount of the second paper material Pu2 based on a detection output of the third sensor. In other words, the control unit 2 is configured to detect a supply amount of the second paper material Pu2.

Next, a control method of the sheet manufacturing apparatus will be described. Specifically, the control method according to the supply unit 10 will be described.

The supply unit 10 of the embodiment is controlled such that the supply amount of the second paper material Pu2 can be changed with respect to the supply amount of the first paper material Pu1. In this case, the supply amount of the second paper material Pu2 may be changed with respect to the supply amount of the first paper material Pu1, the supply amount of the first paper material Pu1 may be changed with respect to the supply amount of the second paper material Pu2, and the first paper material Pu1 and the second paper material Pu2 can be appropriately controlled such that the supply amount can be changed relatively. The supply amount of the first paper material Pu1 and the supply amount of the second paper material Pu2 are detected by the second sensor 332 or the third sensor disposed in the first supply unit 10a and the second supply unit 10b.

Then, for example, if the sheet Pr of relatively low density is manufactured, the supply amount of the second paper material Pu2 with respect to the supply amount (constant amount) of the first paper material Pu1 is increased. That is, a content ratio of the second paper material Pu2 in the raw material (paper material) supplied to the defibrating unit 30 is increased. Thus, it is possible to manufacture the sheet Pr of low density. Moreover, the supply amount of the first paper material Pu1 with respect to the supply amount (constant amount) of the second paper material Pu2 may be decreased. Thus, it is also possible to manufacture the sheet Pr of low density.

Furthermore, for example, if the sheet Pr of relatively high density is manufactured, the supply amount of the second paper material Pu2 with respect to the supply amount (constant amount) of the first paper material Pu1 is decreased. That is, the content ratio of the second paper material Pu2 in the raw material (paper material) supplied to the defibrating unit 30 is decreased. Thus, it is possible to manufacture the sheet Pr of high density. Moreover, the supply amount of the first paper material Pu1 with respect to the supply amount (constant amount) of the second paper material Pu2 may be increased. Thus, it is also possible to manufacture the sheet Pr of high density.

Above, according to the embodiment, the following effects can be obtained.

The used paper as the first paper material Pu1 is supplied from the first supply unit 10a and the release paper containing the glassine paper as the second paper material Pu2 is supplied from the second supply unit 10b. Thus, it is possible to manufacture the sheet Pr having hydrophobic properties and characteristics of low density without using the functional additives such as the hollow particles and the thermoplastic foamed particles. Furthermore, it is possible to easily supply the release paper containing the glassine paper of the roll shape from the second supply unit 10b. That is, the release paper can easily re-use. Furthermore, the supply amount of the first paper material Pu1 and the supply amount of the second paper material Pu2 are controlled, and it is possible to easily manufacture the sheet Pr having different density, strength, texture, and the like.

The invention is not limited to the embodiment described above and it is possible to make various modifications and improvements to the embodiment described above. Modification examples are described as follows. The modification examples may be combined.

MODIFICATION EXAMPLE 1

Figure 3:
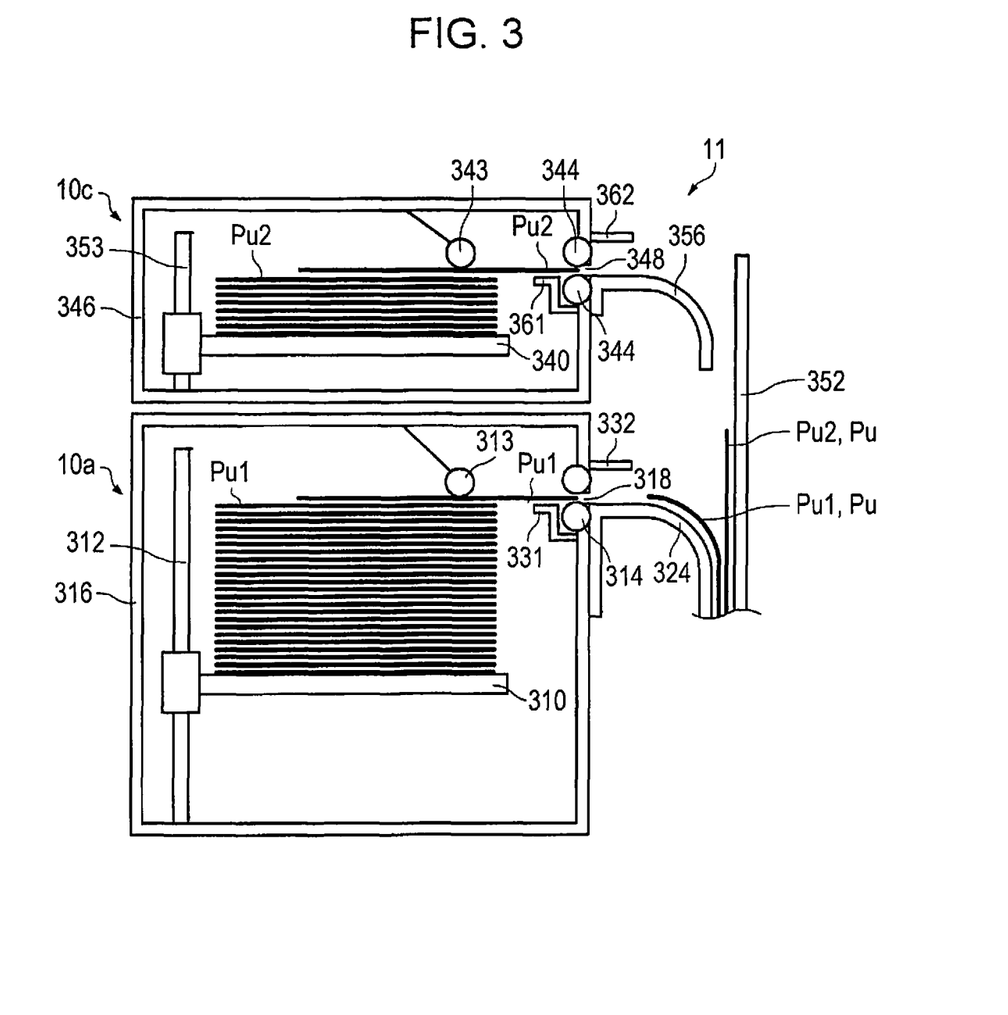
FIG. 3 is a schematic view illustrating a configuration of a supply unit according to a first modification example.

In the embodiment described above, the second supply unit 10b is configured so as to supply the second paper material Pu2 on the roll shape, but is not limited to the embodiment. For example, the second supply unit 10b may be configured to supply a second paper material Pu2 of a single sheet (sheet shape). FIG. 3 is a schematic view illustrating a configuration of a supply unit according to MODIFICATION EXAMPLE 1. As illustrated in FIG. 3, a supply unit 11 includes a first supply unit 10a for supplying a first paper material Pu1 to a defibrating unit 30 and a second supply unit 10c for supplying the second paper material Pu2 of the single sheet to the defibrating unit 30. Moreover, a configuration of the first supply unit 10a is the same as that of the first embodiment and description will be omitted.

The second supply unit 10c according to the modification example is disposed on the first supply unit 10a. The second supply unit 10c has a housing 346 and a stacking unit 340 in which the second paper materials Pu2 are stacked on an inside of the housing 346. Furthermore, the uppermost second paper material Pu2 of the stacked second paper materials Pu2 abuts a pickup roller 343. The pickup roller 343 is rotated and then the uppermost second paper material Pu2 is transported on an outlet 348 side, which is provided in the housing 346. The second paper material Pu2 transported on the outlet 348 side is discharged from the outlet 348 by feeding rollers 344. Then, the discharged second paper material Pu2 is transported along a guide 356. Thereafter, furthermore, the second paper material Pu2 is transported to a crushing unit 20 along a guide 352 and a guide 324. In addition, the stacking unit 340 moves upward whenever one or a plurality of sheets of the second paper materials Pu2 is transported by the pickup roller 343. Furthermore, the position of the stacking unit 340 is able to be moved vertically according to the position of the pickup roller 343 in a vertical direction. Thus, the position of the stacking unit 340 is positioned according to a stacking amount of the second paper material Pu2. Furthermore, the positions of the pickup roller 343 are positioned in a substantially constant position with respect to the feeding rollers 344. In the illustrated example, the stacking unit 340 is connected to an up-down driving shaft unit 353, the up-down driving shaft unit 353 is rotated, and thereby the stacking unit 340 can be moved upward and downward. The rotation of the up-down driving shaft unit 353 is performed by driving of a motor (not illustrated) connected to the up-down driving shaft unit 353. As the up-down driving shaft unit 353, for example, a lead screw is used.

Furthermore, a fourth sensor 361 and a fifth sensor 362 are provided in the second supply unit 10c. The fourth and fifth sensors 361 and 362 are connected to a control unit 2. The fourth sensor 361 is provided in the vicinity of the outlet 348 within the housing 346 of the second supply unit 10c. The fourth sensor 361 detects whether or not the second paper material Pu2 is present on the stacking unit 340. Moreover, a form and an installation position of the fourth sensor 361 are not specifically limited if the fourth sensor 361 can detect whether or not the second paper material Pu2 is present on the stacking unit 340. The fifth sensor 362 is disposed on an outside of the housing 346 and in the vicinity of the outlet 348 of the second supply unit 10c. The fifth sensor 362 detects whether or not the second paper material Pu2 is supplied from the second supply unit 10c (whether or not the second paper material Pu2 is discharged from the outlet 348). Moreover, a form and an installation position of the fifth sensor 362 are not specifically limited if the fifth sensor 362 can detect whether or not the second paper material Pu2 is supplied from the second supply unit 10c. Then, the control unit 2 is configured such that an supply amount of the second paper material Pu2 can be obtained based on an detection output of the fifth sensor 362. Even such a configuration, it is possible to obtain the same effects as the effects described above.

MODIFICATION EXAMPLE 2

In the embodiment described above, the first paper material Pu1 supplied from the first supply unit 10a and the second paper material Pu2 supplied from the second supply unit 10b are transported between the guide 324 and the guide 352 so as to overlap each other, the invention is not limited to the configuration. Transport paths are separately provided for the first paper material Pu1 supplied from the first supply unit 10a and the second paper material Pu2 supplied from the second supply unit 10b, and the first paper material Pu1 and the second paper material Pu2 may be separately transported. Even with such a configuration, it is possible to obtain the same effects as the effects described above.

MODIFICATION EXAMPLE 3

In the embodiment described above, the description is given in which the first paper material Pu1 is the used paper and the second paper material Pu2 is the paper material (the release paper containing the glassine paper) having the resin layer, but the invention is not limited to the embodiment. For example, both the first paper material Pu1 and the second paper material Pu2 may be the paper material having the resin layer. In this case, as the first paper material Pu1 and the second paper material Pu2, for example, paper materials of different types from monochrome photographic paper, color photographic paper, waterproof paper, thermal paper, and the like are used in addition to the release paper containing the glassine paper. Thus, it is possible to form the sheet Pr having different density, strength, texture, and the like.

MODIFICATION EXAMPLE 4

In the embodiment described above, as the supply unit 10, two supply units of the first and second supply units 10a and 10b are provided, and two types paper materials of the first and second paper materials Pu1 and Pu2 can be supplied, but the invention is not limited to the embodiment. For example, three or more supply units are provided and three or more paper materials may be supplied. Thus, it is possible to increase variation of characteristics of the sheet Pr.

The entire disclosure of Japanese Patent Application No. 2014-261887, filed Dec. 25, 2014 is expressly incorporated by reference herein.

What is claimed is:
1. A sheet manufacturing apparatus comprising:
a crushing unit configured to cut a first paper material that does not have a resin layer and a release paper material having a resin layer;
a paper material supply unit configured to supply the first paper material to the crushing unit;
a roll supply unit configured to supply the release paper material in a roll shape to the crushing unit;

a defibrating unit configured to defibrate the first paper material that is cut by the crushing unit and the release paper material that is cut by the crushing unit, in the atmosphere; and a forming unit configured to form a sheet by using at least a part of the defibrated material that is defibrated by the defibrating unit.

2. The sheet manufacturing apparatus according to claim 1, wherein the release paper material having the resin layer is a water-insoluble paper material.

3. The sheet manufacturing apparatus according to claim 2, wherein the release paper material contains a glassine paper.

4. The sheet manufacturing apparatus according to claim 1, further comprising a control unit configured to change a content ratio of a supply amount of the first paper material relative to a total supply amount of the first paper material and the release paper material while both of the first paper material and the release paper material are supplied.

5. The sheet manufacturing apparatus according to claim 4, wherein to change the content ratio, the control unit is configured to increase or decrease the supply amount of the first paper material with respect to a constant supply amount of the release paper material.

6. A sheet manufacturing method comprising:

supplying a first paper material that does not have a resin layer and supplying a release paper material having a resin layer;

crushing the first paper material and the release paper material to form a cut first paper material and a cut release paper material;

defibrating the cut first paper material and the cut release paper material, in the atmosphere; and forming a sheet by using at least a part of the defibrated material, wherein the release paper material is supplied in a roll shape.

7. The sheet manufacturing method according to claim 6, wherein the first paper material is a used paper.

8. The sheet manufacturing method according to claim 6, further comprising changing a content ratio of a supply amount of the first paper material relative to a total supply amount of the first paper material and the release paper material while both of the first paper material and the release paper material are supplied.

9. The sheet manufacturing method according to claim 8, wherein to change the content ratio, the supply amount of the first paper material is increased or decreased with respect to a constant supply amount of the release paper material.

* * * * *